US010542590B2

(12) United States Patent
Laurent et al.

(10) Patent No.: US 10,542,590 B2
(45) Date of Patent: Jan. 21, 2020

(54) INDUCTION COOKING DEVICE

(75) Inventors: Mathilde Laurent, Paris (FR); Rene Gy, Bondy (FR); Stephanie Pelletier, Paris (FR); Gaelle Ferriz, Reims (FR); Emmanuel Lecomte, Nesles la Montagne (FR)

(73) Assignee: EUROKERA S.N.C., Chateau Thierry (FR)

( * ) Notice: Subject to any disclaimer, the term of this patent is extended or adjusted under 35 U.S.C. 154(b) by 1669 days.

(21) Appl. No.: 14/114,673

(22) PCT Filed: Apr. 23, 2012

(86) PCT No.: PCT/FR2012/050880
§ 371 (c)(1),
(2), (4) Date: Oct. 29, 2013

(87) PCT Pub. No.: WO2012/146860
PCT Pub. Date: Nov. 1, 2012

(65) Prior Publication Data
US 2014/0061186 A1  Mar. 6, 2014

(30) Foreign Application Priority Data
Apr. 29, 2011 (FR) ...................................... 11 53670

(51) Int. Cl.
H05B 6/12 (2006.01)
H05B 6/02 (2006.01)

(52) U.S. Cl.
CPC .................. H05B 6/1209 (2013.01)

(58) Field of Classification Search
CPC ..... C03C 3/089; C03C 3/091; C03C 2217/72; C03C 3/087; C03C 23/007; C03C 15/02; C03C 21/00; C03C 3/093; H05B 6/1209; A47B 2200/0094
USPC .... 219/649, 622, 623, 460.1, 626, 620, 625, 219/627, 663, 664, 671, 635, 628; 264/134; 428/141; 126/211; 204/192.12, 298.02; 501/55, 68, 69, 70, 501/72, 53, 66
See application file for complete search history.

(56) References Cited

U.S. PATENT DOCUMENTS 5,656,558 A  8/1997 Brix et al.
5,776,844 A  7/1998 Koch et al.
5,958,812 A  9/1999 Koch et al.
2005/0037912 A1  2/2005 El Khiati et al.
2005/0250639 A1* 11/2005 Siebers .................. C03C 3/083
501/68
2007/0179039 A1  8/2007 El Khiati et al.
2007/0295711 A1  12/2007 Striegler et al.
2009/0221207 A1*  9/2009 Russell .................. C03C 27/06
445/25
2009/0325778 A1  12/2009 El Khiati et al.
2010/0089606 A1*  4/2010 Kwon ..................... C03C 3/087
174/50.5
2010/0167035 A1  7/2010 Striegler
2013/0183512 A1  7/2013 Gy et al.
2013/0256301 A1  10/2013 Laurent et al.

FOREIGN PATENT DOCUMENTS

| CN | 101734867 A | 6/2010 |
|----|-------------|--------|
| EP | 1 090 888 A1 | 4/2001 |
| EP | 1 314 704 | 5/2003 |
| GB | 2 079 119 | 1/1982 |
| JP | 7-69669 A | 3/1995 |
| JP | 2000-310427 A | 11/2000 |
| JP | 2001-172042 A | 6/2001 |
| JP | 2004-227816 A | 8/2004 |
| JP | 2008-8609 A | 1/2008 |
| JP | 2014-504431 A | 2/2014 |
| WO | 98 40320 | 9/1998 |

OTHER PUBLICATIONS

International Search Report dated Aug. 17, 2012 in PCT/FR12/050880 Filed Apr. 23, 2012.

* cited by examiner

*Primary Examiner* — Quang T Van
(74) *Attorney, Agent, or Firm* — Oblon, McClelland, Maier & Neustadt, L.L.P.

(57) ABSTRACT

An induction cooking device including at least one inductor positioned under a thermally strengthened glass plate, the composition of which glass is not of lithium aluminosilicate type, characterized in that the glass has the following characteristics:
  its thickness is at most 4.5 mm,
  the c/a ratio of the glass before strengthening is at most 3.0 after Vickers indentation under a load of 1 kg, c being the length of the radial cracks and a being the half-diagonal of the Vickers impression,
  the $\sigma/(e \cdot E \cdot \alpha)$ ratio is at least 20 K·mm$^{-1}$, or even 30 K·mm$^{-1}$, σ being the maximum stress generated at the core of the glass by the thermal strengthening in Pa, e being the thickness of the glass in mm, E being the Young's modulus in Pa and α being the linear thermal expansion coefficient of the glass in K$^{-1}$
is provided.

21 Claims, No Drawings

INDUCTION COOKING DEVICE

CROSS REFERENCE TO RELATED APPLICATIONS

The present application is a 35 U.S.C. § 371 national stage patent application of International patent application PCT/FR2012/050880, filed on Apr. 23, 2012, published as WO/2012/146860 on Nov. 1, 2012, the text of which is incorporated by reference, and claims the benefit of the filing date of French application no. 1153670, filed on Apr. 29, 2011, the text of which is also incorporated by reference.

The invention relates to the field of induction cooking devices.

Induction cooking devices comprise at least one inductor positioned under a glass-ceramic plate. These devices are fitted into a worktop or into the frame of a cooker. The plate serves as a support for the cooking utensils (saucepans, frying pans, etc.), which are heated owing to the electric current induced within them by the magnetic field generated by the inductors. Lithium aluminosilicate glass-ceramics are used for this purpose owing to their thermal shock resistance, which is a result of their zero or almost zero thermal expansion coefficient. Glass-ceramics are produced by subjecting lithium aluminosilicate glass plates to a high-temperature heat treatment, which treatment generates within the plate crystals of beta-quartz or beta-spodumene structure, the thermal expansion coefficient of which is negative.

In 1980 it was proposed by patent application GB 2 079 119 to use, instead of glass-ceramic, thick glass plates (having a thickness of 5 or 6 mm) that are optionally tempered. However, these plates were never marketed because their thermomechanical resistance proved insufficient for practical and daily use, so that induction cooking devices are, 30 years later, still based on glass-ceramic.

The inventors have been able to demonstrate that certain glass plates could lend themselves to an actual use in induction cooking devices, by satisfying the most rigorous tests.

The subject of the invention is an induction cooking device comprising at least one inductor positioned under a thermally strengthened glass plate, the composition of which glass is not of lithium aluminosilicate type, characterized in that the glass has the following characteristics:
  its thickness is at most 4.5 mm,
  the c/a ratio of the glass before strengthening is at most 3.0 after Vickers indentation under a load of 1 kg, c being the length of the radial cracks and a being the half-diagonal of the Vickers impression,
  the $\sigma/(e \cdot E \cdot \alpha)$ ratio is at least 20 K·mm$^{-1}$, or even 25 or 30 K·mm$^{-1}$, $\sigma$ being the maximum stress generated at the core of the glass by the thermal strengthening in Pa, e being the thickness of the glass in mm, E being the Young's modulus in Pa and $\alpha$ being the linear thermal expansion coefficient of the glass in K$^{-1}$.

Thermal strengthening is also referred to as tempering or hardening. It consists in heating the glass beyond its glass transition temperature, then cooling it abruptly, generally by means of nozzles that transport air to the surface of the glass. As the surface cools more quickly than the core of the glass, compressive stresses are formed at the surface of the glass plate, balanced by tensile stresses at the core of the plate.

The performances linked to these properties are such that it is possible to use them to form thin plates and/or plates of large lateral dimensions, which plates are the most likely to break. The thickness of the plate is preferably at most 4.5 mm, in particular 4 mm and even 3.5 mm. The thickness is generally at least 2 mm. The glass plate preferably has a lateral dimension of at least 0.5 m, or even 0.6 m. The largest dimension is generally at most 1.50 m. The number of inductors is preferably at least 2, in particular 3 or 4. Indeed, it is for devices of this type that the choice of the glass becomes very particularly crucial.

The glass used in the device according to the invention preferably has at least one of the following six properties, in all possible combinations:

1. The product $E \cdot \alpha$ of the Young's modulus (in Pa) and of the linear thermal expansion coefficient of the glass (in K$^{-1}$) is between 0.1 and 0.8 MPa·K$^{-1}$, especially between 0.2 and 0.5 MPa·K$^{-1}$, in particular between 0.2 and 0.4 MPa·K$^{-1}$. Too low a product $E \cdot \alpha$ makes the thermal tempering more difficult, whereas too high a product $E \cdot \alpha$ reduces the thermal shock resistance.
2. The lower annealing temperature of the glass is at least 500° C., in particular 600° C. and even 630° C. This temperature is preferably at most 800° C., in particular 700° C. Frequently referred to as the "strain point" in the art, it corresponds to the temperature at which the viscosity of the glass is $10^{14.5}$ Poise (1 Poise=0.1 Pa·s). High lower annealing temperatures make it possible to avoid any detempering of the glass during the operation of the cooking device.
3. The linear thermal expansion coefficient of the glass is at most $50 \times 10^{-7}$ K$^{-1}$, and in particular is between 30 and $45 \times 10^{-7}$ K$^{-1}$, or even between 32 (or 35) and $45 \times 10^{-7}$ K$^{-1}$. High thermal expansion coefficients do not make it possible to obtain a satisfactory thermal shock resistance. On the other hand, too low a thermal expansion coefficient makes it difficult to obtain sufficient strengthening.
4. The c/a ratio of the glass before strengthening is at most 2.8, in particular 2.7, or 2.5, and even 0.5, or even 0.2, or else 0.1. This ratio is even preferably zero. Surprisingly, this property, though measured before strengthening, has proved to have an impact of prime importance on the resistance of the plates during the actual operation of the cooking devices according to the invention.
5. The $\sigma/(e \cdot E \cdot \alpha)$ ratio of the glass is at least 20 K·mm$^{-1}$, in particular 30 K·mm$^{-1}$. The $\sigma/(e \cdot E \cdot \alpha)$ ratio is normally at most 200 K·mm$^{-1}$, or even 100 K·mm$^{-1}$. This property has proved to have a significant impact for eliminating the risk of breakage of the plate during the operation of the cooking device.
6. The maximum stress generated at the core of the glass by the thermal strengthening is preferably at least 20 MPa, in particular 25 or 30 MPa, and even 40 MPa.

In order to optimize its thermomechanical resistance, the glass used according to the invention preferably has all these preferred features in combination. Other combinations are possible, especially the combinations of the properties 1+2, 1+3, 1+4, 1+5, 1+6, 2+3, 2+4, 2+5, 2+6, 3+4, 3+5, 3+6, 4+5, 4+6, 5+6, 1+2+3, 1+2+4, 1+2+5, 1+2+6, 1+3+4, 1+3+5, 1+3+6, 1+4+5, 1+4+6, 1+5+6, 1+2+3+4, 1+2+3+5, 1+2+3+6, 1+3+4+5, 1+3+4+6, 1+3+5+6, 1+4+5+6, 1+2+3+4+5, 1+2+3+4+6, 1+2+3+5+6, 1+2+4+5+6, 1+3+4+5+6.

In particular, the glass used is preferably thermally tempered and preferably has the following characteristics: its thickness is at most 4.5 mm, the c/a ratio is at most 2.5, and the $\sigma/(e \cdot E \cdot \alpha)$ ratio is at least 20 K·mm$^{-1}$, or even 30 K·mm$^{-1}$.

The linear thermal expansion coefficient is measured according to the ISO 7991:1987 standard between 20° C. and 300° C. and is expressed in K$^{-1}$. The lower annealing temperature is measured according to the ISO 7884-7:1987 standard.

The Young's modulus (or modulus of elasticity) E is measured by four-point bending on a glass test specimen of $100 \times 10 \times 4$ mm$^3$. The two lower supports are located at a distance of 90 mm from one another, whereas the two upper supports are located at a distance of 30 mm from one another. The upper supports are centered relative to the lower supports. The force is applied to the middle of the test specimen, from above. The strain is measured using a tensometer, and the Young's modulus is calculated as being the ratio between the stress and the strain. The measurement uncertainty is generally of the order of 3% in relative terms. The Young's modulus is expressed in Pa.

The c/a ratio is measured as explained in detail below. A Vickers indenter of TestWell FM7 type is loaded to P=1000 g at room temperature, for 30 s, the descent speed being equal to 50 μm/s. The measurements of a (half-diagonal of the Vickers impression) and c (length of the radial cracks, starting from the corners of the impression, in the direction of the diagonal) are carried out using an optical microscope 1 h after the experiment. The result is the arithmetic mean of a set of 10 measurements.

The core stress a (the maximum tensile stress generated at the core of the glass by the thermal strengthening) is measured by photoelasticity using a polariscope, for example the polariscope sold by the company GlasStress Ltd. under the name SCALP-04. Using a plate, the stress is generally measured at the center of the plate (2 measurements), and at the 4 corners, at at least 10 cm from the edges. The result is an average of these 6 measurements, expressed in Pa.

According to one preferred embodiment, the composition of the glass is of borosilicate type.

In this case, the chemical composition of the glass preferably comprises silica $SiO_2$ in a weight content ranging from 70% to 85%, boron oxide $B_2O_3$ in a weight content ranging from 8% to 20% and at least one alkali metal oxide, the total weight content of alkali metal oxides ranging from 1% to 10%.

The chemical composition of the borosilicate glass preferably comprises (or consists essentially of) the following constituents, varying within the weight limits defined below:
  $SiO_2$ 70%-85%, especially 75%-85%,
  $B_2O_3$ 8%-16%, especially 10%-15% or 9%-12%,
  $Al_2O_3$ 0-5%, especially 0-3% or 2%-5%,
  $K_2O$ 0-2%, especially 0-1%,
  $Na_2O$ 1%-8%, especially 2%-6%.

Preferably, the composition may also comprise at least one of the following oxides: MgO, CaO, SrO, BaO and ZnO, in a total weight content ranging from 0 to 10%, especially CaO in a weight content ranging from 1% to 2%.

According to another preferred embodiment, the composition of the glass is of alumino-borosilicate type, in particular free of alkali metal oxides.

In this case, the chemical composition of the glass preferably comprises silica $SiO_2$ in a weight content ranging from 45% to 68%, alumina $Al_2O_3$ in a weight content ranging from 8% to 20%, boron oxide $B_2O_3$ in a weight content ranging from 4% to 18% and alkaline-earth metal oxides chosen from MgO, CaO, SrO and BaO, in a total weight content ranging from 5% to 30%, the total weight content of alkali metal oxides not exceeding 10%, in particular 1% or even 0.5%. The expression "free of alkali metal oxides" is understood to mean that the total weight content of alkali metal oxides is at most 1%, in particular 0.5%, and even 0.1%.

The chemical composition of the alumino-borosilicate glass preferably comprises (or consists essentially of) the following constituents, varying within the weight limits defined below:
  $SiO_2$ 45%-68%, especially 55%-65%,
  $Al_2O_3$ 8%-20%, especially 14%-18%,
  $B_2O_3$ 4%-18%, especially 5%-10%,
  RO 5%-30%, especially 5%-17%,
  $R_2O$ at most 10%, especially 1%.

As is customary in the art, the expression "RO" denotes the alkaline-earth metal oxides MgO, CaO, SrO and BaO, while "$R_2O$" denotes alkali metal oxides. Such compositions make it possible to obtain very low c/a ratios, in particular of at most 1, or even 0.6.

The expression "consists essentially of" should be understood to mean that the aforementioned oxides constitute at least 96%, or even 98% of the weight of the glass. The composition usually comprises additives that are used for refining the glass or for coloring the glass. The refining agents are typically chosen from arsenic oxide, antimony oxide, tin oxide, cerium oxide, halogens, metal sulfides, especially zinc sulfide. The weight content of refining agents is normally at most 1%, preferably between 0.1% and 0.6%. The coloring agents are iron oxide, present as an impurity in most of the batch materials, cobalt oxide, chromium oxide, copper oxide, vanadium oxide, nickel oxide, selenium. The total weight content of coloring agents is normally at most 2%, or even 1%. The introduction of one or more of these agents may result in a dark glass plate, having a very low light transmission (typically of at most 3%, in particular 2% and even 1%) being obtained, which will have the advantage of concealing the inductors, the electric wiring, and also the control and monitoring circuits of the cooking device. Another alternative, described further on in the text, consists in equipping a portion of the surface of the plate with an opaque or substantially opaque coating, or in positioning an opaque material, preferably of dark color, between the plate and the internal elements of the device.

The plates may be manufactured in a known manner by melting pulverulent batch materials then forming of the glass obtained. The melting is typically carried out in refractory furnaces with the aid of burners that use air or, better still, oxygen as oxidizer and natural gas or fuel oil as fuel. Molybdenum or platinum resistors submerged in the molten glass may also provide all or some of the energy used for obtaining a molten glass. Batch materials (silica, borax, colemanite, hydrated alumina, limestone, dolomite, etc.) are introduced into the furnace and undergo, under the effect of the high temperatures, various chemical reactions, such as decarbonation reactions, actual melting reactions, etc. The maximum temperature reached by the glass is typically at least 1500° C., in particular between 1600° C. and 1700° C. The glass can be formed into plates in a known manner by rolling the glass between metal or ceramic rolls, or else by the float process, a technique that consists in pouring the molten glass onto a bath of molten tin.

As indicated above, it is preferable for the glass plate to be capable of concealing the inductors, the electric wiring, and also the control and monitoring circuits of the cooking device. Preferably, only the display devices are visible to the user. In particular when the transmission of the glass plate as is is too high (typically above 3%), it is possible to provide a portion of the surface of the plate (that which, in the cooking device, is located opposite the elements to be concealed) with a coating deposited on and/or underneath the plate, said coating having the ability to absorb and/or reflect and/or scatter the light radiation. The coating may be deposited underneath the plate, that is to say on the surface facing the internal elements of the device, also referred to as the "lower face", and/or on the plate, that is to say on the upper face.

The coating may be continuous or discontinuous, for example may have patterns, or a mesh or spotted or speckled screen. It may especially be a screened enamel positioned on the upper face of the plate. In certain cases, the coating may be continuous in certain zones, and discontinuous in other zones. Thus, it is possible to have a discontinuous coating level with the heating elements and a continuous coating elsewhere, while reserving an uncoated zone opposite the light-emitting devices. The light transmission of the plate equipped with its coating, in the coated zones, is preferably at most 0.5% and even 0.2%. The coating may be completely opaque.

The zone opposite the light-emitting devices may also be provided with a coating, on condition that this coating is not opaque.

Advantageously, the plate also comprises a decoration on the upper face, generally made of enamel, the role of which is decorative, and which is not intended to mask the internal elements of the cooking device. The decoration generally makes it possible to identify the heating zones (for example by representing them in the form of a circle), the control zones (especially the touch-sensitive controls), to provide information or represent a logo. This decoration should be differentiated from the coating described above and more specifically in what follows, which constitutes a real masking means.

Preferably, the coating may be an organic-based layer, such as a layer of paint or of lacquer, or a mineral-based layer, such as an enamel or a metallic or metal oxide, nitride, oxynitride or oxycarbide layer. Preferably, the organic layers will be deposited on the lower face, whereas the mineral layers, especially the enamels, will be deposited on the upper face.

The paint which may be used is advantageously chosen so as to withstand high temperatures and to exhibit stability, over time, with respect to its color and its cohesion with the plate, and so as not to adversely affect the mechanical properties of the plate.

The paint used advantageously has a degradation temperature of greater than 300° C., in particular between 350° C. and 700° C. It is generally based on resin(s), where appropriate filled (for example with pigment(s) or dye(s)), and is optionally diluted in order to adjust its viscosity for the purpose of applying it to the plate, the diluent or solvent (for example white spirit, toluene, solvents of aromatic hydrocarbon type, such as the solvent sold under the trademark Solvesso 100® by Exxon, etc.) being, where appropriate, removed during the subsequent baking of the paint.

For example, the paint may be a paint based on at least one silicone resin, in particular a silicone resin modified by the incorporation of at least one radical such as an alkyd or phenyl or methyl radical, etc. It is also possible to add pigments as colorants, such as pigments for enamels (chosen for example from components containing metal oxides, such as chromium oxides, copper oxides, iron oxides, cobalt oxides, nickel oxides, or from copper chromates, cobalt chromates, etc.), $TiO_2$, etc. It is also possible to use, as pigments, particles of one or more metals such as aluminum, copper, iron, etc., or alloys based on at least one of these metals. The pigments may also be "effect pigments" (pigments having a metallic effect, interference pigments, pearlescent pigments, etc.), advantageously in the form of aluminum oxide ($Al_2O_3$) flakes coated with metal oxides; mention may be made, for example, of the pigments sold by MERCK under the trademark Xirallic®, such as $TiO_2/Al_2O_3$ pigments or interference pigments (Xirallic® T-50-10SW Crystal Silver or Xirallic® T-60-23SW Galaxy Blue or Xirallic® T-60-24SW Stellar Green), or $Fe_2O_3/Al_2O_3$ pigments (Xirallic® T-60-50SW Fireside Copper or Xirallic® F-60-51 Radiant Red). Other effect pigments that may be used are, for example, pearlescent pigments based on mica particles coated with oxides or a combination of oxides (chosen, for example, from $TiO_2$, $Fe_2O_3$, $Cr_2O_3$, etc.), such as those sold under the trademark IRIODIN® by Merck, or based on silica platelets coated with oxides or a combination of oxides (like those above), such as those sold under the trademark Colorstream® by Merck. Fillers or other conventional coloration pigments may also be incorporated with the aforementioned effect pigments.

Particularly preferably, the paint used comprises at least (or is based on) a high-temperature-resistant (co)polymer (in particular that has a degradation temperature above 400° C.), it being possible or not for this paint to contain at least one mineral filler in order to ensure its cohesion or its mechanical reinforcement and/or its coloration. This (co)polymer or resin may especially be one or more of the following resins: polyimide, polyamide, polyfluorinated, poly-silsesquioxane and/or polysiloxane resin.

Polysiloxane resins are particularly preferred: they are colorless, and therefore capable of being colored (for example with fillers or pigments that give them the desired color); they may be used in the crosslinkable state (generally due to the presence of SiOH and/or SiOMe groups in their formula, these groups usually reaching up to 1% to 6% by weight of their total weight), or they be may converted (crosslinked or pyrolyzed). Advantageously, they have within their formula phenyl, ethyl, propyl and/or vinyl units, very advantageously phenyl and/or methyl units. They are preferably chosen from polydimethylsiloxanes, polydiphenylsiloxanes, phenylmethylsiloxane polymers and dimethylsiloxane/diphenylsiloxane copolymers.

The crosslinkable polysiloxane resins preferably used generally have a weight-average molecular weight (Mw) between 2000 and 300 000 Daltons.

It may be indicated, nonlimitingly, that Dow Corning® 804, 805, 806, 808, 840, 249, 409 HS and 418 HS resins, Rhodorsil® 6405 and 6406 resins from Rhodia, Triplus® resins from General Electric Silicone and SILRES® 604 resins from Wacker Chemie GmbH, used alone or as a mixture, are perfectly suitable.

The resins thus chosen are especially capable of withstanding induction heating.

The paint may be free of mineral fillers, especially if its thickness remains small. However, such mineral fillers are generally used, for example to mechanically strengthen the layer of paint deposited, to contribute to the cohesion of said layer and to its attachment to the plate, to combat the appearance and propagation of cracks within it, etc. For such purposes, at least one fraction of said mineral fillers preferably has a lamellar structure. The fillers may also be used for the coloring. Where appropriate, several types of complementary fillers may be used (for example colorless fillers for mechanical reinforcement and other fillers such as pigments for coloring). The effective amount of mineral fillers generally corresponds to a volume content of 10% to 60%, more particularly of 15% to 30% (volume contents based on the total volume of the fillers and of the paint).

The thickness of each paint layer deposited may be between 1 and 100 microns, in particular between 5 and 50 microns. The paint or resin may be applied by any suitable technique, such as brush deposition, doctor blade deposition, spraying, electrostatic deposition, dip-coating, curtain coating, screen printing, inkjet printing, etc. and preferably takes place by screen printing (or optionally doctor blade deposition). The screen-printing technique is particularly advantageous in that it readily makes it possible to reserve certain zones of the plate, especially the zones which will be facing the light-emitting devices, or even the zones located opposite the radiant heating means. When other techniques are used, the reserved areas may be obtained by placing suitable masks over the zones that are not desired to be covered.

The deposition may be followed by a heat treatment intended to provide, as the case may be, the drying, crosslinking, pyrolysis, etc. of the deposited layer(s).

Preferably, at least one layer of paint is chosen in which the resin has been, at least in part, crosslinked and/or pyrolyzed, partially or completely, and/or has not been heat treated (the resin may optionally be intended to be removed from the places where it has not been heat treated), said layer of paint consisting, in part or completely, of a mixture a) of mineral fillers and b) of at least one crosslinkable polysiloxane resin (almost) free of precursor(s) of carbon-based material(s) and/or of at least one crosslinked polysiloxane resin (almost) free of carbon-based material(s) and of precursor(s) of carbon-based material(s) and/or of a porous mineral matrix based on silica (the resin having, for example, been pyrolyzed and therefore being mineralized), (almost) free of carbon-based material(s), the mineral fillers being distributed in the resin or the matrix.

The layer of paint is preferably covered with a protective layer, for example made of silicone resin modified by alkyl radicals or polysiloxane resin.

As indicated previously, the coating may also be an enamel. The enamel is formed from a powder comprising a glass frit and pigments (it being possible for these pigments to also be part of the frit), and from a medium for the application to the substrate.

The glass frit is preferably obtained from a vitrifiable blend comprising, generally, oxides chosen in particular from silicon oxide, zinc oxide, sodium oxide, boron oxide, lithium oxide, potassium oxide, calcium oxide, aluminum oxide, magnesium oxide, barium oxide, strontium oxide, antimony oxide, titanium oxide, zirconium oxide and bismuth oxide. Glass frits that are particularly suitable are described in applications FR 2782318 or WO 2009/092974.

The pigments may be chosen from the compounds containing metal oxides such as chromium oxide, copper oxide, iron oxide, cobalt oxide, nickel oxide, etc., or may be chosen from copper chromate or cobalt chromate, etc., the content of pigment(s) in the frit(s)/pigment(s) assembly being, for example, between 30% and 60% by weight.

The pigments may also be "effect pigments" (pigments having a metallic effect, interference pigments, pearlescent pigments, etc.), such as those cited previously in relation to a paint. The content of effect pigments may be, for example, of the order of 30% to 60% by weight relative to the base (glass frit) into which they are incorporated.

The layer may especially be deposited by screen printing (the base and the pigments being, where appropriate, put into suspension in a suitable medium generally intended to be consumed in a subsequent firing step, it being possible for this medium, in particular, to comprise solvents, diluents, oils, resins, etc.), the thickness of the layer being, for example, of the order of 1 to 6 μm.

The screen-printing technique is particularly advantageous in that it readily makes it possible to reserve certain zones of the plate, especially the zones which will be opposite the light-emitting devices.

The or each enamel layer used to form the coating is preferably a single layer, separated from other optional enamel layer(s), and having a thickness that does not generally exceed 6 μm, preferably that does not exceed 3 μm. The enamel layer is generally deposited by screen printing.

The coating may also be a metallic layer or a metal oxide, nitride, oxynitride or oxycarbide layer. The term "layer" should also be understood to include stacks of layers. This layer may be absorbent and/or reflective.

This layer may therefore be, for example, at least one single metallic or mainly metallic layer (for example a thin layer of Ag, W, Ta, Mo, Ti, Al, Cr, Ni, Zn, Fe, or of an alloy based on several of these metals, or a thin layer based on stainless steels, etc.), or may be a stack of (sub)layers comprising one or more metallic layers, for example a metallic (or mainly metallic) layer advantageously protected (coated on at least one face and preferably on its two opposite faces) by at least one layer based on a dielectric material (for example, at least one layer made from silver or aluminum coated with at least one $Si_3N_4$ protective layer— in particular an $Si_3N_4$/metal/$Si_3N_4$ stack—or an $SiO_2$ protective layer).

It may alternatively be a single-layer coating based on a dielectric material having a high refractive index n, that is to say a refractive index greater than 1.8, preferably greater than 1.95, and particularly preferably greater than 2, for example a single layer of $TiO_2$, or of $Si_3N_4$, or of $SnO_2$, etc.

In another advantageous embodiment, the layer may be formed from a stack of thin (sub)layers based on dielectric material(s) alternately having high (preferably greater than 1.8, or even 1.95, or even 2, as explained previously) and low (preferably less than 1.65) refractive indices, especially material(s) of the following types: metal oxide (or metal nitride or oxynitride), such as $TiO_2$, $SiO_2$ or mixed oxide (tin-zinc, zinc-titanium, silicon-titanium, etc.) or alloy, etc.; the (sub)layer that is deposited, where appropriate, first and that is therefore against the inner face of the plate, advantageously being a layer of high refractive index.

As the (sub)layer material having a high refractive index, mention may be made, for example, of $TiO_2$ or optionally $SnO_2$, $Si_3N_4$, $Sn_xZn_yO_z$, $TiO_x$ or $Si_xTi_yO_z$, ZnO, $ZrO_2$, $Nb_2O_5$, etc. As the (sub)layer material having a low refractive index, mention may be made, for example, of $SiO_2$, or optionally a silicon oxynitride and/or oxycarbide, or a mixed oxide of silicon and aluminum, or a fluoro compound, for example of the $MgF_2$ or $AlF_3$ type, etc.

The stack may comprise, for example, at least three (sub)layers, the layer closest to the substrate being a layer of high refractive index, the intermediate layer being a layer of low refractive index and the outer layer being a layer of high refractive index (for example, a stack comprising the following alternation of oxide layers: (substrate)—$TiO_2$/$SiO_2$/$TiO_2$).

The (geometric) thickness of each layer based on thin layer(s) that is deposited is generally between 15 and 1000 nm, in particular 20 and 1000 nm (the thickness of the substrate generally being a few millimeters, most often around 4 mm), it being possible for the thickness of each of the (sub)layers (in the case of a stack) to vary between 5 and 160 nm, generally between 20 and 150 nm (for example in the case of the $TiO_2$/$SiO_2$/$TiO_2$ stack, it may be around a few tens of nanometers, for example around 60-80 nm, for the $TiO_2$ layers and around 60-80 or 130-150 nm for the $SiO_2$ layer depending on the appearance, for example more silvery or more golden, that it is desired to obtain).

The layer based on one or more thin layers may be applied to the plate in line or in a subsequent step (for example after the cutting and/or shaping of said plate). It may especially be applied by (powder, liquid or gaseous) pyrolysis, by evaporation or by spraying. Preferably, it is deposited by spraying and/or by a vacuum and/or plasma-enhanced deposition method; in particular, the method of depositing the layer(s) by sputtering (for example, by magnetron sputtering), especially enhanced by a magnetic field (and in DC or AC mode) is used, the oxides or nitrides being deposited from one or more suitable metal or alloy or silicon or ceramic, etc., targets, if necessary under oxidizing or nitriding conditions (argon/oxygen or argon/nitrogen mixtures where appropriate). It is also possible to deposit, for example, oxide layers by reactive sputtering of the metal in question in the presence of oxygen and the nitride layers in the presence of nitrogen. To make the $SiO_2$ or $Si_3N_4$ it is possible to start from a silicon target that is lightly doped with a metal such as aluminum to make it sufficiently conductive. The (sub) layer(s) chosen according to the invention condense on the substrate in a particularly homogeneous manner, without separation or delamination occurring.

Besides the glass plate and at least one inductor (preferably three or four and even five), the cooking device may comprise at least one light-emitting device, at least one control and monitoring device, the assembly being in a housing.

A, the or each light-emitting device is advantageously chosen from light-emitting diodes (for example belonging to 7-segment displays), liquid crystal displays (LCDs), optionally organic, light-emitting diode (OLED) displays, and fluorescent displays (VFDs). The colors seen through the plate are diverse: red, green, blue and all the possible combinations, including yellow, violet, white, etc. These light-emitting devices may be purely decorative, for example may visually separate various zones of the plate. Most often however they will have a functional role displaying various information useful for the user, especially indication of the heating power, of the temperature, of cooking programs, of cooking time, of zones of the plate exceeding a predetermined temperature.

The control and monitoring devices generally comprise touch-sensitive controls, for example of the capacitive or infrared type.

All of the internal elements are generally attached to a housing, often metallic, which therefore constitutes the lower part of the cooking device, normally concealed in the worktop or in the body of the cooker.

The following examples illustrate the invention without however limiting it.

A sheet of borosilicate glass referred to as B1, with a thickness of 3.8 mm and having the weight composition defined below is produced in a known manner by melting and forming via the float process. Plates of 590×590 mm² are cut from this glass sheet.
$SiO_2$ 80.5%
$Al_2O_3$ 2.5%
$B_2O_3$ 13.0%
$Na_2O$ 3.4%
$K_2O$ 0.6%.
The c/a ratio is 1.7.
The glass sheet is then thermally tempered, by heating at 730° C. and cooling in air, so that the maximum core stress is 30 MPa.
The properties of the glass sheet are the following:
Young's modulus (E): 60 GPa.
Linear expansion coefficient ($\alpha$): $34 \times 10^{-7}$ $K^{-1}$.
E·$\alpha$: 0.20 MPa/K.
Lower annealing temperature: 500° C.
$\sigma/(e \cdot E \cdot \alpha)$: 39 K/mm.

A sheet of borosilicate glass referred to as B2, with a thickness of 4.0 mm and having the weight composition defined below is produced in a known manner by melting and forming via the float process. Plates of 590×590 mm² are cut from this glass sheet.
$SiO_2$ 80.6%
$Al_2O_3$ 2.2%
$B_2O_3$ 12.9%
$Na_2O$ 4.1%
$K_2O$ 0.2%.
The c/a ratio is 1.9.
The glass sheet is then thermally tempered, by heating at 730° C. and cooling in air, so that the maximum core stress is 20 MPa.
The properties of the glass sheet are the following:
Young's modulus (E): 61 GPa.
Linear expansion coefficient ($\alpha$): $35 \times 10^{-7}$ $K^{-1}$.
E·$\alpha$: 0.21 MPa/K.
Lower annealing temperature: 509° C.
$\sigma/(e \cdot E \cdot \alpha)$: 23 K/mm.

These plates B1 and B2 are compared to two comparative plates of the same size, one being a glass plate referred to as C, of soda-lime-silica composition, the other being a glass plate referred to as B3, of borosilicate composition.

The glass C has the following weight composition:
$SiO_2$ 69%
$Al_2O_3$ 0.5%
CaO 10.0%
$Na_2O$ 4.5%
$K_2O$ 5.5%
SrO 7.0%
$ZrO_2$ 3.5%.
Its properties are the following.
The thickness is 4 mm.
The c/a ratio is 3.4.
The glass sheet is thermally tempered so that the maximum core stress is 70 MPa.
Young's modulus (E): 76 GPa.
Linear expansion coefficient ($\alpha$): $76 \times 10^{-7}$ $K^{-1}$.
E·$\alpha$: 0.58 MPa/K.
Lower annealing temperature: 582° C.
$\sigma/(e \cdot E \cdot \alpha)$: 30 K/mm.

The borosilicate glass B3 has the following weight composition:
$SiO_2$ 79%
$Al_2O_3$ 2.5%
$B_2O_3$ 14.2%
$Fe_2O_3$ 0.012%
$Na_2O$ 3.6%
$K_2O$ 0.6%.
Its properties are the following.
The thickness of the glass is 3.8 mm.
The c/a ratio is 1.7.
The glass sheet is thermally strengthened so that the maximum core stress is 4 MPa.
Young's modulus (E): 64 GPa.
Linear expansion coefficient ($\alpha$): $32 \times 10^{-7}$ $K^{-1}$.
E·$\alpha$: 0.20 MPa/K.
Lower annealing temperature: 518° C.
$\sigma/(e \cdot E \cdot \alpha)$: 5 K/mm.

Table 1 below summarizes the various properties of the glasses tested.

TABLE 1

|  | B1 | B2 | B3 | C |
|---|---|---|---|---|
| Thickness (mm) | 3.8 | 4.0 | 3.8 | 4.0 |
| c/a | 1.7 | 1.9 | 1.7 | 3.4 |
| E (GPa) | 60 | 61 | 64 | 76 |
| α ($10^{-7}$ K$^{-1}$) | 34 | 35 | 32 | 76 |
| E · α (MPa · K$^{-1}$) | 0.20 | 0.21 | 0.20 | 0.58 |
| σ/(e · E · α) (K · mm$^{-1}$) | 39 | 23 | 5 | 30 |

The usability tests of the plate are described below.

Each glass plate is subjected to a test cycle successively comprising the following steps:

2 passes of sand, with a load of 3.9 g/cm$^2$, an "empty saucepan" test, then, if the plate has not broken, 5 passes of a scouring pad sold under the name Scotch Brite Green, under a load of 1 kg/cm$^2$, an "empty saucepan" test, then, if the plate has not broken, 10 passes of a 4.5 kg stainless steel triple-bottom saucepan, an "empty saucepan" test.

The "empty saucepan" test is carried out as follows. The center of the plate is positioned over the heating element of an induction hob equipped with an inductor of reference E.G.O. A2, without clamping of the edges of the plate. 200 milliliters of water are brought to boiling at maximum power, in a 20 cm diameter Lagostina Pandora saucepan. Once all of the water has evaporated, the hob is only turned off after the saucepan has been empty for 10 to 15 minutes. The maximum temperature reached by the plate on the lower face reaches 390° C.

The plate is judged to be satisfactory if no breakage is observed after this cycle of tests.

None of the 10 borosilicate glass plates B1 or B2 tested breaks after this cycle of tests.

As regards the borosilicate glass plate B3 on the other hand, the 10 plates tested broke. For the soda-lime-silica glass C, 5 plates out of the 10 tested broke.

The glass plates B1 and B2 therefore prove to be advantageous replacements for lithium aluminosilicate glass-ceramics in induction cooking devices.

Other glass plates A1 and A2 that can be used in a device according to the invention are listed in table 2 below.

TABLE 2

|  | A1 | A2 |
|---|---|---|
| SiO$_2$ | 50 | 59 |
| Al$_2$O$_3$ | 10 | 17 |
| B$_2$O$_3$ | 15 | 7 |
| MgO | — | 0.8 |
| CaO | — | 4 |
| SrO | — | 1.8 |
| BaO | 25 | 10 |
| R$_2$O | — | — |
| thickness (mm) | 4.0 | 4.0 |
| c/a | 2.0 | 0.5 |
| E (GPa) | 69 | 71 |
| α ($10^{-7}$ K$^{-1}$) | 47 | 38 |
| E · α (MPa · K$^{-1}$) | 0.32 | 0.27 |
| σ/(e · E · α) (K · mm$^{-1}$) | 43 | 50 |
| Lower annealing T (° C.) | 593 | 666 |

The invention claimed is:

1. An induction cooking device comprising at least one inductor positioned under a thermally strengthened glass plate, wherein the glass plate is (a) an alumino-borosilicate glass or (b) a borosilicate glass, wherein:

a thickness of the glass plate is at most 4.5 mm, a c/a ratio of the glass plate before strengthening is at most 3.0 after Vickers indentation under a load of 1 kg, c being a length of radial cracks and a being a half-diagonal of the Vickers impression, and a σ/(e·E·α) ratio is at least 20 K·mm$^{-1}$, σ being a maximum stress generated at a core of the glass plate by the thermal strengthening in Pa, e being the thickness of the glass plate in mm, E being a Young's modulus in Pa and α being a linear thermal expansion coefficient of the glass plate in K$^{-1}$.

2. The device of claim 1, wherein the thickness of the glass plate is at most 4 mm.

3. The device of claim 1, wherein the glass plate has a lateral dimension of at least 0.5 m.

4. The device of claim 1, wherein the product E·α of the Young's modulus and of the linear thermal expansion coefficient of the glass plate is between 0.1 and 0.8 MPa·K$^{-1}$.

5. The device of claim 1, wherein a lower annealing temperature of the glass plate is at least 500° C.

6. The device of claim 1, wherein the linear thermal expansion coefficient of the glass plate is at most 50×10$^{-7}$ K$^{-1}$.

7. The device of claim 1, wherein the c/a ratio of the glass plate before strengthening is at most 2.8.

8. The device of claim 1, wherein the maximum stress generated at the core of the glass plate by the thermal strengthening is at least 20 MPa.

9. The device of claim 1, wherein the the glass is a borosilicate glass.

10. The device of claim 9, wherein the glass comprises silica SiO$_2$ in a weight content ranging from 70% to 85%, boron oxide B$_2$O$_3$ in a weight content ranging from 8% to 20% and at least one alkali metal oxide, the total weight content of alkali metal oxides ranging from 1% to 10%.

11. The device of claim 10, wherein the glass comprises, by weight:

70 to 85% of SiO$_2$, 8 to 16% of B$_2$O$_3$, 0 to 5% of Al$_2$O$_3$, 0 to 2% of K$_2$O, and 1 to 8% of Na$_2$O.

12. The device of claim 1, wherein the composition of the glass is an alumino-borosilicate glass.

13. The device of claim 12, wherein the glass comprises, by weight:

45 to 68% of SiO$_2$, 8 to 20% of Al$_2$O$_3$, 4 to 18% of B$_2$O$_3$, 5 to 30% of RO, and at most 10% of R$_2$O, wherein RO is at least one alkaline-earth metal oxide selected from the group consisting of MgO, CaO, SrO and BaO, and R$_2$O is an alkali metal oxide.

14. The device of claim 1, wherein a portion of the surface of the glass plate is equipped with an opaque or substantially opaque coating, or wherein an opaque material is positioned between the glass plate and internal elements of the device.

15. The device of claim 1, wherein the σ/(e·E·α) ratio is at least 30 K·mm$^{-1}$.

16. The device of claim 1, wherein the product E·α of the Young's modulus and of the linear thermal expansion coefficient of the glass plate is between 0.2 and 0.5 MPa·K$^{-1}$.

17. The device of claim 1, wherein a lower annealing temperature of the glass plate is at least 600° C.

18. The device of claim 1, wherein the linear thermal expansion coefficient of the glass plate is between 30 and $45 \times 10^{-7}$ $K^{-1}$.

19. The device of claim 1, wherein the c/a ratio of the glass plate before strengthening is at most 2.5.

20. The device of claim 1, wherein the maximum stress generated at the core of the glass plate by the thermal strengthening is at least 25 MPa.

21. The device of claim 12, wherein the glass comprises, by weight:
- 55 to 65% of $SiO_2$,
- 14 to 18% of $Al_2O_3$,
- 5 to 10% of $B_2O_3$,
- 5 to 17% of RO, and
- at most 1% of $R_2O$, wherein RO is at least one alkaline-earth metal oxide selected from the group consisting of MgO, CaO, SrO and BaO, and $R_2O$ is an alkali metal oxide.

\* \* \* \* \*